(12) United States Patent
Troyer et al.

(10) Patent No.: US 8,121,887 B2
(45) Date of Patent: Feb. 21, 2012

(54) METHOD AND SYSTEM FOR REPORTING ON THE QUALITY OF A REPAIR PROCESS

(75) Inventors: William J. Troyer, Stow, OH (US); David Ray Brocious, Strongsville, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 2724 days.

(21) Appl. No.: 10/652,139

(22) Filed: Aug. 29, 2003

(65) Prior Publication Data

US 2005/0049912 A1    Mar. 3, 2005

(51) Int. Cl.
*G06Q 10/00* (2006.01)
(52) U.S. Cl. ...................... 705/7.38; 705/7.41
(58) Field of Classification Search ............... 705/11, 705/7.38, 7.41
See application file for complete search history.

(56) References Cited

U.S. PATENT DOCUMENTS

| 6,804,589 | B2 * | 10/2004 | Foxford et al. | 701/29 |
| 6,952,679 | B1 * | 10/2005 | Pulford | 705/7 |
| 7,236,976 | B2 * | 6/2007 | Breitenbach et al. | 707/100 |
| 2002/0072808 | A1 * | 6/2002 | Li | 700/5 |
| 2002/0188479 | A1 * | 12/2002 | Renwick et al. | 705/4 |
| 2002/0194329 | A1 * | 12/2002 | Alling | 709/224 |
| 2003/0111525 | A1 * | 6/2003 | Sweeney et al. | 235/376 |
| 2003/0182181 | A1 * | 9/2003 | Kirkwood et al. | 705/11 |

OTHER PUBLICATIONS

Harvey, "Service quality: a tutorial", Journal of Operations Management 16 (1998) 583-597.*
Stewart et al, "Professional service quality", Journal of Retailing and Consumer Services, vol. 5, No. 4, pp. 209-222, 1998.*
"The Quality Process", copyrighted 2001 PineTree Consulting.

* cited by examiner

*Primary Examiner* — Thomas L. Mansfield, Jr.
(74) *Attorney, Agent, or Firm* — Julze Meder

(57) ABSTRACT

A method of reporting on the quality of repair work performed on an article such as a vehicle including the steps of: (1) identifying occurrences of quality problems in repair of an article at a repair facility, (2) generating quality data on the occurrences of quality problems of step (a), (3) electronically transferring the quality data to a computer database, (4) sorting the quality data in the database and (5) producing a report of the sorted quality data. A system for practicing this method includes one or more repair shops in communication with a computer. Data on the insurance of quality problems during the repair of vehicles is transmitted from the repair shops to the computer which then sorts the quality data in the database and produces reports of assorted quality data to provide information to repair shops, insurance companies and manufacturers.

23 Claims, 3 Drawing Sheets

METHOD AND SYSTEM FOR REPORTING ON THE QUALITY OF A REPAIR PROCESS

BACKGROUND OF THE INVENTION

1. Field of the Invention

The present invention relates to a method and system for reporting on the quality of a repair process, more particularly to a method of and system for reporting on occurrences of quality problems in the repair of a vehicle at an autobody repair facility.

2. Prior Art

Autobody repair typically is performed in an autobody repair shop that may be an independent operator, a franchise repair shop, or a division of an automobile dealership. When a vehicle body is damaged, the owner brings the vehicle to an autobody repair shop to receive an estimate for repair of a vehicle's apparent damage. Personnel at the autobody shop prepare an estimate based on the damage that is visible to the exterior of the vehicle. Upon authorization by the owner and, where applicable, insurance approval is gained for performing the work, the repair shop begins the repair process. A repair shop typically provides an estimated completion date to the owner of the vehicle at the time the initial damage estimate is prepared. The repair shop then schedules the vehicle to be repaired and orders the parts that are determined to be needed for completing the repair. The vehicle is released to the repair shop by the owner and disassembly of the vehicle to complete the repair is initiated. Ideally, all parts required for the repair are available to repair technicians at the time of repair and all repair functions are performed properly. However, in reality, some breakdown in the repair process occurs which leads to added cost to the repair shop or longer time for the repair to be completed.

Vehicle owners often are significantly inconvenienced when their vehicles are undergoing repair. When the repair is completed after the original estimated completion date, vehicle owners become displeased with the repair shop. Insurance companies also have a stake in the timely and proper repair of vehicles. A significant portion of vehicle repair is covered by the owner's automobile insurance policy. As such, insurance companies seek repair shops which are capable of performing vehicle repair in the shortest amount of time and with the highest quality. This minimizes the expense borne by the insurance companies for the cost of temporary vehicle rental while the insured vehicle is repaired.

Repair shops are beginning to recognize the benefits of monitoring quality of their work in a formalized manner. While a repair shop may be able to identify occurrences of quality problems in its repair processes, the shop typically is unable to readily compare the frequency of quality problems occurring within the shop as compared to other shops in its geographic area. Likewise, insurance companies do not have access to information for comparing the quality of repair processes performed at various repair shops.

Accordingly, a need remains for a method and system of reporting on the quality of repair work performed on a vehicle at a vehicle repair facility.

SUMMARY OF THE INVENTION

This need is met by the method and system of the present invention of reporting on the quality of repair work performed on an article having steps of identifying the occurrences of quality problems in repair of the article in a repair facility, generating quality data on the occurrences of the quality problems, electronically transferring the quality data to a computer database, sorting the quality data in the database and producing a report of the sorted quality data. Data on an estimate of the cost for repairing the article and the length of time to complete the repair may be obtained, and the estimate data may also be transferred to the database and incorporated into the report.

The method is particularly suited for determining the quality of repair work performed on a vehicle, such as autobody repair. Quality problems which arise during autobody repair include incorrect estimate, failure to procure repair parts, procurement of incorrect repair parts, repair parts unavailable at the time of repair, improper welding, poor fit of parts, improper corrosion protection, poor workmanship, incomplete repair, insufficient vehicle protection and improper refinish color match.

The quality data may include information on the date of repair such that the report of sorted quality data identifies the quantity of occurrences of quality problems occurring in a time period. The quantity of repairs having occurrences of quality problems in a time period may be compared to the total quantity of repairs performed in the same time period. The quality data may further include identification of the stage of repair at which the quality data was collected. For example, the quality data may be collected at delivery of the vehicle to the repair facility, disassembly of the vehicle, frame repair, metal repair, mechanical repair, preparation for refinishing, application of refinish, reassembly of the vehicle and delivery of the vehicle to its owner. The quality data may then be sorted according to one of the repair stages. The quality data may be sorted by factors relating to the repair such as: (i) vehicle manufacturer, (ii) vehicle model, (iii) vehicle year, (iv) insurance company, (v) estimated repair cost, (vi) estimated repair time, (vii) actual repair time, (viii) labor cost, (ix) parts cost, (x) materials cost, (xi) total repair cost, (xii) repair cost facility overhead and (xiii) level of repair.

The method of the present invention may be performed on a computer network. As such, the present invention includes a system for reporting on the quality of repair work having means for collecting quality data on occurrences of quality problems in repair of an article at a repair facility, a computer database for tabulating the collected quality data and software for sorting the tabulated quality data and producing a report on the sorted quality data. The computer database may be maintained on a global communications network.

A complete understanding of the present invention will be obtained from the following description when taken in connection with the accompanying drawing figures wherein like reference characters identify like parts or steps throughout.

DESCRIPTION OF THE PREFERRED EMBODIMENTS

The present invention includes a system and method for reporting on the quality of repair work performed on a vehicle undergoing repair. Although the present invention is described in relationship to the occurrences of quality problems during the repair of a vehicle in an autobody repair shop, this is not meant to be limiting. The present invention is equally applicable to other industries in which an article undergoes a lengthy manufacturing or repair process, such as in appliance repair.

Figure 1:
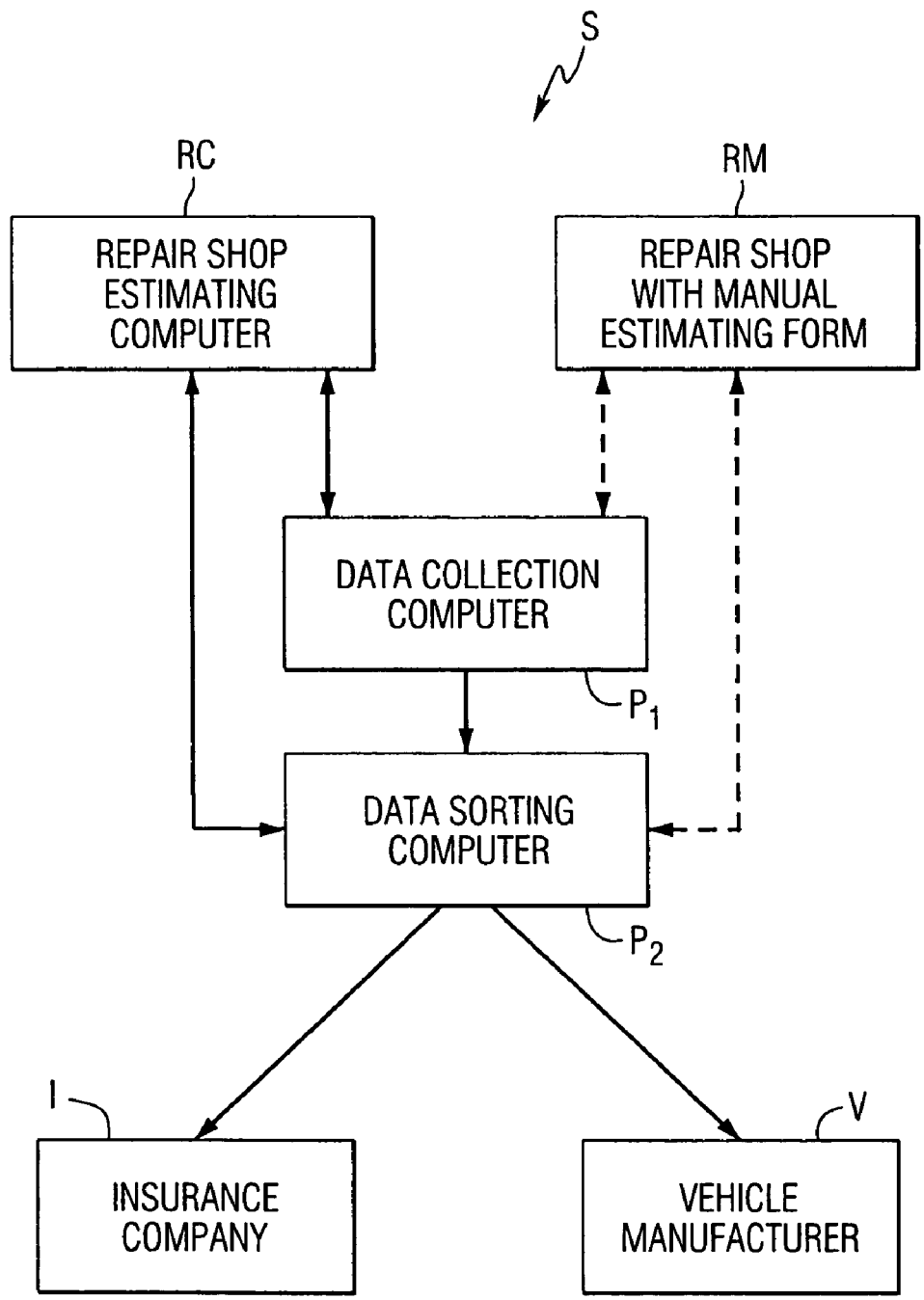
FIG. 1 is a schematic of a system of the present invention for reporting the quality of repair work performed on a vehicle.

FIG. 1 schematically shows one embodiment of a system S of the present invention having one or more repair shops RC (only one being shown) in communication with a data collection computer $P_1$. The repair shop RC includes a computer for producing estimate data on a vehicle to be repaired at the repair shop RC and for entering quality data according to the present invention. The system S may further include one or more repair shops RM (only one being shown) which uses manual estimating forms and a manual method of collecting and entering quality data, such as on paper forms. Such paper forms can be delivered to the location of the data collection computer $P_1$ or a computer linked thereto. The data collected by computer $P_1$ is transferred to a data sorting computer $P_2$. The data sorting computer $P_2$ includes software having various algorithms for sorting the quality data. It will be appreciated that the functions of computers $P_1$ and $P_2$ may be combined in a single computer or shared between more than two computers. The solid lines linking the components of the system S indicate communication links which may be paperless such as via hardwiring, wireless communications, Internet communications or the like. The dashed lines linking the repair shop RM and the data sorting computer $P_2$ indicates manual communication, for example via mail, facsimile, hand delivery or the like. One or both of the computers $P_1$ and $P_2$ (or the single computer or multiple computers performing their functions) may be maintained on a global communications network. The arrows on the solid and dashed lines of FIG. 1 indicate directions of information flow. The data sorting computer $P_2$ may also be in communication with one or more insurance companies I and one or more vehicle manufacturers V. Although only one of each of repair shop RC, repair shop RM, insurance company I and vehicle manufacturer V is shown in FIG. 1, this is not meant to be limiting. The systems may include a plurality of such components and corresponding communication links, and the communication links may be all electronic or all manual or a combination thereof.

Figure 2:
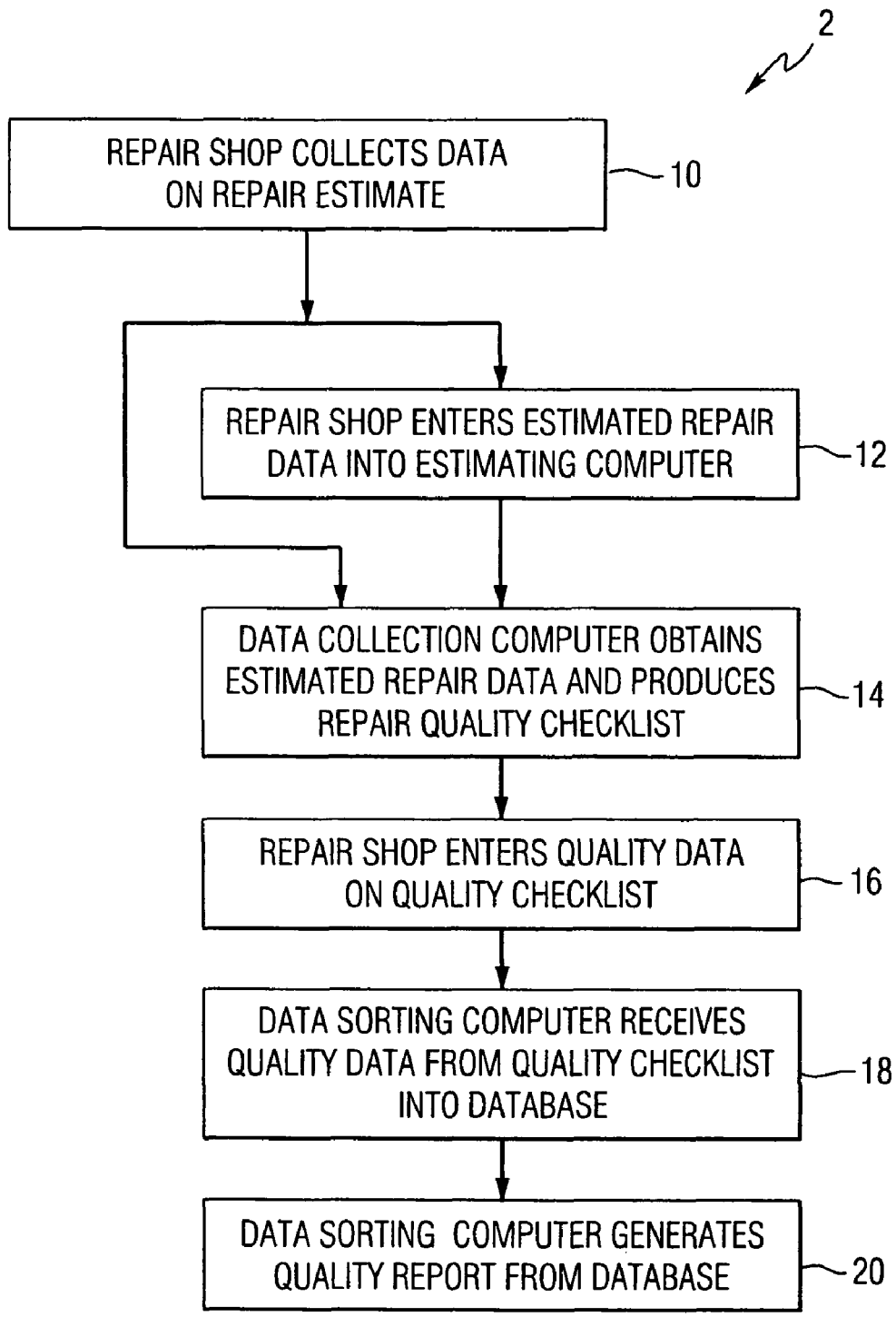
FIG. 2 is a flowchart of a method of using the system shown in FIG. 1.

FIG. 2 presents a flowchart 2 of steps of a method of using the system S of the present invention. In step 10, a repair shop prepares an estimate of the cost to repair a vehicle in an autobody repair shop and collects estimate data on the estimate. Nonlimiting examples of estimate data produced when preparing an estimate include: (i) the vehicle manufacturer, (ii) the vehicle model, (iii) the vehicle year, (iv) the insurance company of the vehicle undergoing repair, (v) an estimate of the time to complete the repair, (vi) an estimate of the labor costs, (vii) an estimate of the parts cost, (viii) an estimate of the cost of the materials used in performing the repair, and (ix) an estimate of the total repair cost. The estimate data may further include an indication of repair level of the estimated repair and a portion of the overhead of the repair shop. By repair level it is meant a general degree of repair work to be performed as determined by the time to complete the repair and/or the cost of the repair, for example a light repair level, a medium repair level or a heavy repair level.

The estimate data may be collected manually, such as in paper form, or electronically. Many existing vehicle repair shops possess computers having software installed thereon which is designed to produce a repair estimate for an owner or an insurance company. In optional step 12, the repair shop enters the estimate data into an estimating computer. As stated, step 12 may not occur for repair shops RM which do not possess an estimating computer. Accordingly, repair shop RM delivers the estimate data directly to the location of the data collection computer $P_1$ for data entry into the computer $P_1$ or to the location of the data sorting computer $P_2$ for data entry into the computer $P_2$. When repair shop RC generates electronic estimate data (via its estimating computer), the estimate data is sent to the data collection computer $P_1$ which extracts the estimate data from the electronic submission of the repair shop RC. A vehicle repair estimate typically includes detailed information on the repair to be performed which may not be of particular value in the present invention. Estimate data that is suitable for use in the present invention includes customer name, vehicle identification number (VIN), vehicle make, vehicle model and vehicle manufacture year. In step 14, the data collection computer $P_1$ obtains the estimate data and produces a repair quality checklist for use by the repair shop during the repair process. The repair quality checklist produced in step 14 is transmitted to the repair shop RC or RM, electronically or in paper form. One portion of the quality checklist includes the estimate data for the vehicle undergoing repair and another portion of the quality checklist includes a standardized form to be completed by the repair shop RC or RM. The standardized quality checklist ensures that the quality data collected by the repair shops RC or RM is consistent in type and scope from shop to shop.

During the repair of the vehicle, the repair shop enters quality data on the quality checklist as in step 16. While flowchart 2 indicates the use of separate steps 10, 12 and 14, it is also possible to combine the functions of those steps within step 16. In this manner, the estimate data and quality data are collected essentially simultaneously and transferred to the data collection computer $P_1$. The repair shop RC or RM may enter all the data (estimate and quality) onto the quality checklist prior to any transfer of information to the data collection computer $P_1$.

The quality data identifies occurrences of quality problems that arise during the repair of a vehicle at repair shop RC or RM. Upon completion of the repair, the quality checklist is transmitted to the data sorting computer $P_2$ in step 18. The quality data from the checklist is then input into a database maintained on the data sorting computer $P_2$. The network database contains information on estimated repair data and associated information on the occurrences of quality problems occurring during those repairs. In step 20, the data sorting computer $P_2$ generates a quality report from the computer database by sorting the quality data within the computer database. The quality report may then be sent to the repair shop RC or RM, insurance company I and/or vehicle manufacturer V as shown in FIG. 1.

Figure 3:
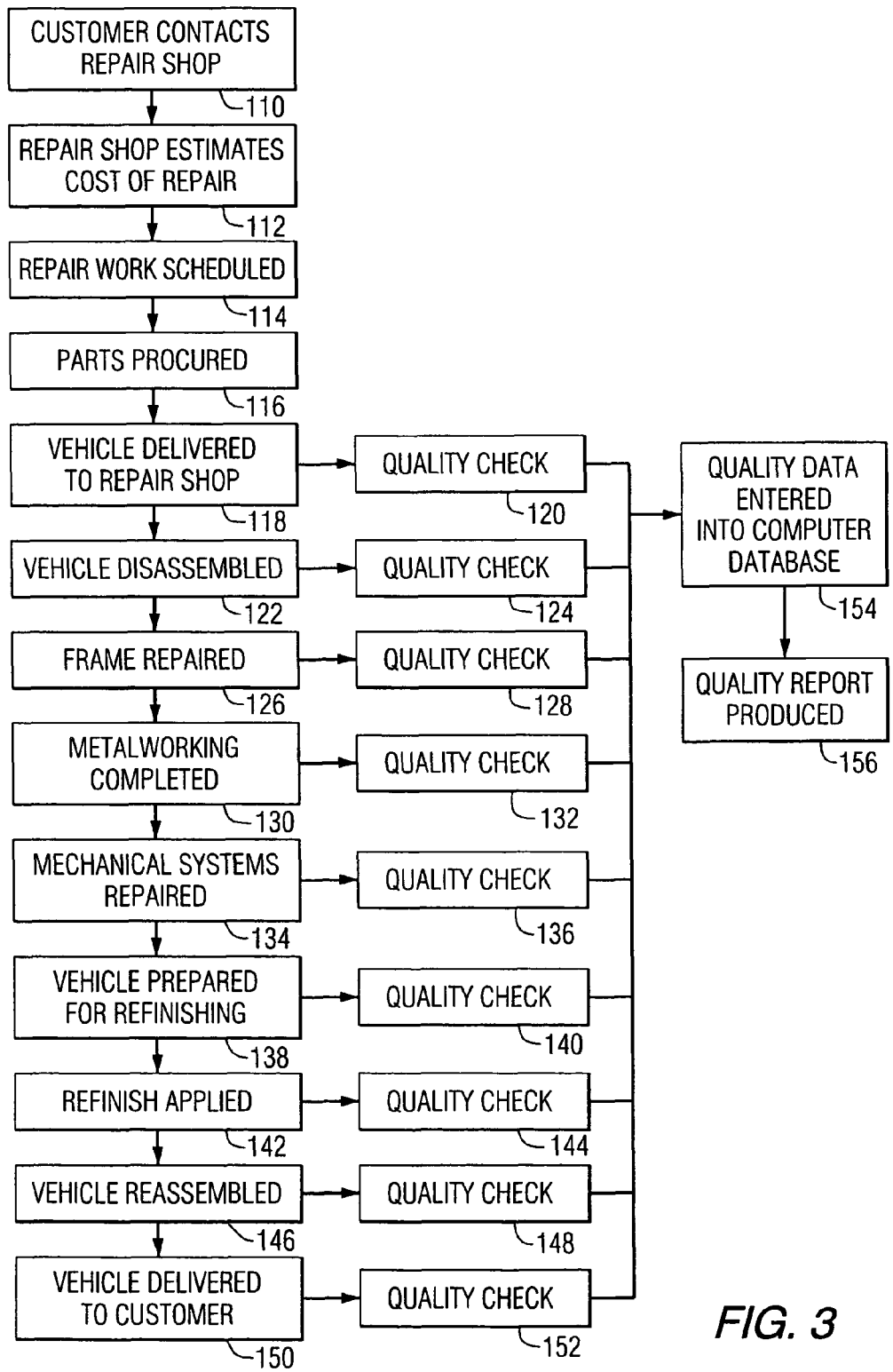
FIG. 3 is a flowchart of a method of using the system shown in FIG. 1 including an exemplary quality process for using the present invention.

FIG. 3 is a flowchart 102 of an exemplary quality process which may be employed by a vehicle repair shop to monitor the work performed during a vehicle repair including quality checkpoints throughout the process. The quality checkpoints present an opportunity to identify occurrences of quality problems in stages of the repair process. Nonlimiting examples of quality problems which arise during repair of a vehicle are listed below. One or more of such quality problems may be checked for at each quality checkpoint.

(i) Incorrect estimate. During disassembly of the vehicle or during performance of repairs, additional damage to the vehicle may be discovered. Additional damage typically requires that more parts are needed to complete the repair and/or more time is needed to complete the repair. In either event, the original repair estimate is too low and the vehicle owner or the insurance company needs to be informed of the added costs. The inability to detect and estimate for such hidden damage is viewed negatively by the consumers of vehicle repair.

(ii) Failure to procure repair parts. The parts needed for the repair may have been noted during preparation of the estimate, but the parts were not procured.

(iii) Procurement of incorrect repair parts. Parts for the repair may have been ordered, but the parts procured are incorrect.

(iv) Parts unavailable. Parts needed for the repair are properly procured, but are not available to repair personnel at the repair shop at the time of the repair. For example, the parts may still be in the shop's inventory and not accessible to repair personnel at a repair bay in the shop.

(v) Improper welding. The metal welds are faulty or lacking.

(vi) Poor fit of parts. The structural components of the vehicle are not fitted together properly during reassembly.

(vii) Improper corrosion protection. Corrosion protection is not properly applied to the vehicle in locations where the original corrosion protection was damaged or removed during the repair.

(viii) Poor workmanship. The overall quality of the repair work performed is below standard for the repair shop.

(ix) Incomplete repair. A portion of the repair work is not completed.

(x) Insufficient vehicle protection. When the vehicle is delivered to the repair shop to begin work, that vehicle does not have adequate protection from damage or theft during the time that it is in the possession of the repair shop.

(xi) Improper refinish color match. Upon completion of the structural aspects of the repair, the vehicle generally requires refinishing. Matching of the color of the refinish composition to the original finish of the vehicle may not be accurately performed.

The quality process set forth in flowchart 102 is not meant to be limiting. Other process steps may be included in the quality process or may replace those which are shown in the flowchart 102. By way of example, a customer in need of autobody repair contacts a repair shop in step 110. Contact with the repair shop may also occur by an insurance company which is seeking repair of its insured vehicles. The repair shop then estimates the cost of the repair in step 112. The repair work is scheduled in step 114, and parts are procured in step 116. In step 118, the vehicle is delivered to the repair shop to begin the work. A quality check for vehicle protection is performed in step 120 to ensure that measures are taken to protect the vehicle. In step 122, the vehicle is disassembled and a quality check 124 is performed. Examples of quality problems which may occur during disassembly step 122 include incorrect estimate, lack of repair parts, incorrect parts, parts unavailable and insufficient vehicle protection.

In step 126, the frame of the vehicle is repaired and the quality check 128 of the frame repair step 126 is performed. During the step 126, examples of quality problems which may occur include incorrect estimate, failure to procure repair parts, procurement of incorrect parts and insufficient vehicle protection. The metalworking process of repairing the frame of step 130 may also be the subject of quality problems, and a quality check 132 thereof is performed. Examples of occurrences of quality problems in the metalworking of the repair of a vehicle include incorrect estimate, failure to procure repair parts, procurement of incorrect parts, parts unavailable, improper welding, poor fit of parts, improper corrosion protection, poor workmanship, incomplete repair and improper vehicle protection.

In step 134, the mechanical systems of the vehicle are repaired and quality check 136 is performed. In step 138, the vehicle is prepared for refinishing and quality check 140 is performed. In step 142, the refinish composition as applied to the vehicle and quality check 144 is performed. Quality checks 136, 140 and 144 may identify similar occurrences of quality problems as in quality check 132. The vehicle is reassembled in step 146 and quality check 148 is performed. In quality check 148 following reassembly of the vehicle of step 146, quality problems which may occur include incorrect estimate, failure to procure repair parts, procurement of incorrect parts, poor fit of parts, improper corrosion protection, poor workmanship, incomplete repair, improper vehicle protection and improper refinish color match. Finally, in step 150, the vehicle is delivered to the customer and quality check 152 is performed. In quality check 152, occurrences of quality problems may include incorrect estimate, failure to procure repair parts, poor fit of parts, improper corrosion protection, poor workmanship, incomplete repair, improper vehicle protection and improper refinish color match.

For each of the quality checks performed in steps 120, 124, 128, 132, 136, 140, 144, 148 and 152, a notation is made on the quality checklist as to each occurrence of a quality problem during the repair of a vehicle. In addition, the quality checklist includes an indication of the repair cycle time, namely, the time from start to finish of the repair. Repair cycle time may also be broken down by the cycle time for each of the steps 112, 114, 116, 118, 122, 126, 130, 134, 138, 142, 146 and 150. The quality data of the quality checklist is entered into the data collection computer $P_1$ in step 154. Quality data may be electronically transferred to the data collection computer $P_1$ by a repair shop having a computer RC or manually by a repair shop RM which is not electronically connected to the data collection computer $P_1$.

The data sorting computer $P_2$ includes software for producing quality reports in step 156. The format of a quality report depends on the need of an end user. For a repair shop, it may be useful to sort the quality data by vehicle make, model and year. This indicates which vehicles (by make, model and/or year) are more prone to present quality problems during a repair. Quality data may also be sorted by cycle time to search for patterns of vehicles requiring excessive repair time. If a certain set of vehicles consistently exhibits longer cycle times, the repair shop may increase the cost of future repairs of vehicles in that set to improve its profitability. Similarly, the quality data may be sorted by cycle time of each repair step to indicate to the repair shop which functions within the repair shop may need additional attention or corrective action. The quality data may also be sorted by level of repair (e.g. light, medium or heavy). Quality data sorted by repair level may indicate which repair levels are more or less likely to have occurrences of quality problems. A shop can then readjust its repair procedures or pricing or both as needed for repairs at certain repair levels. A repair shop may also use the reports of quality to demonstrate its advantages over other repair shops. To the extent that the repair shop has access to the quality data for other repair shops within the shop's geographical area, a comparison of the shop to those in the surrounding geographic area could show its advantages as having fewer occurrences of quality problems. The geographic area can be limited to a neighborhood, a city, a state or the like.

Insurance companies are also interested in the information produced in the quality report for an individual repair shop and groups of repair shops. For example, the cycle time for a repair shop would indicate to an insurance company if a shop is working at a rate comparable to that of an industry standard in a geographic area of interest. Insurance companies may also be interested in sorting the quality data by the information about the vehicle (manufacturer, model and year) to provide information regarding pricing for insuring such vehicles.

The quality report may also be useful to a vehicle manufacturer that is interested in the reparability of its vehicles. If a vehicle manufacturer can identify that certain models of its vehicles have higher occurrences of quality problems consistently during repair, the vehicle manufacturer can take steps to alleviate those problems in future vehicles.

The present invention provides several benefits to repair shops, insurance companies and vehicle manufacturers in providing reports on occurrences of quality problems during the repair of vehicles. By transferring the estimate data and the quality data to a database of a network computer, the data can be sorted and manipulated to produce many types of reports including tables, bar graphs, pie charts and graphs over time, all with optional comparisons to other data sets.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A method of reporting on the quality of repair work performed on an article comprising the steps of:
    (a) identifying occurrences of quality problems in repair of an article at a repair facility;
    (b) creating repair checkpoints in a repair facility;
    (c) generating estimate data on the estimated cost for repairing the article, the estimate data being transferred to the database, said estimate data includes a repair estimate factor;
    (d) generating quality data on the occurrences of quality problems of step (a) at each repair checkpoint in a repair facility for an article;
    (e) electronically transferring the quality data to a computer database;
    (f) sorting the quality data in the database utilizing said repair estimate factor for producing a report of said quality data which relates to industry indicators; and
    (g) producing a report of the sorted quality data.

2. The method of claim 1, wherein the article is a vehicle.

3. The method of claim 2, wherein the quality problems are selected from the group consisting of incorrect estimate, failure to procure repair parts, procurement of incorrect repair parts, repair parts unavailable, improper welding, poor fit of parts, improper corrosion protection, poor workmanship, incomplete repair, insufficient vehicle protection and improper refinish color match.

4. The method of claim 3, wherein the quality data includes information on the date of the repair and the report of step (e) identifies the quantity of quality problems in a time period.

5. The method of claim 3, wherein the report of step (e) compares the quantity of repairs having at least one occurrence of a quality problem in a time period to the total quantity of repairs performed in the time period.

6. The method of claim 3, wherein the checkpoint comprises delivery of the vehicle to the repair facility, disassembly of the vehicle, frame repair, metal repair, mechanical repair, preparation for refinishing, application of refinish, reassembly of the vehicle and delivery of the vehicle to its owner.

7. The method of claim 6, wherein sorting comprises reporting the quality data according to one of the repair checkpoints.

8. The method of claim 2, wherein said repair estimate factor comprises one of: a vehicle manufacturer, vehicle model, vehicle year, insurance company, repair time, labor cost, parts cost, materials cost, total repair cost, repair facility overhead, geographic area and repair level.

9. The method of claim 2, wherein said report having industry indicators comprising one of: repair shop problem, vehicle repair cost, vehicle reparability and vehicle insurance cost balance.

10. The method of claim 2, wherein steps (d), (e), (f) and (g) are performed on a computer network.

11. The method of claim 10, wherein the computer database of step (e) is maintained on a global communications network.

12. A system for reporting on the quality of repair work performed on an article comprising:
    (a) means for collecting quality data on occurrences of quality problems in repair of an article at a checkpoint of a repair facility;
    (b) a computer having a database for tabulating the collected quality data; and
    (c) software for sorting the tabulated quality data based on estimated repair factors for repair work needed at the checkpoint and producing a report of the sorted quality data.

13. The system of claim 12, wherein the article is a vehicle and the repair facility is a vehicle repair facility.

14. The system of claim 13, wherein the quality problems are selected from the group consisting of incorrect estimate, failure to procure repair parts, procurement of incorrect repair parts, repair parts unavailable, improper welding, poor fit of parts, improper corrosion protection, poor workmanship, incomplete repair, insufficient vehicle protection and improper refinish color match.

15. The system of claim 14, wherein the quality data further comprises information on the date of the repair and the software includes an algorithm for sorting the quality data for repairs having at least one occurrence of a quality problem in a time period.

16. The system of claim 14, wherein the checkpoint comprises one of: delivery of the vehicle to the repair facility, disassembly of the vehicle, frame repair, metal repair, mechanical repair, preparation for refinishing, application of refinish or reassembly of the vehicle and delivery of the vehicle to its owner.

17. The system of claim 16, wherein the software includes an algorithm for sorting the quality data according to one of the repair stages.

18. The system of claim 13, wherein the quality data includes the estimate data and the software includes an algorithm for sorting the quality data according to a repair estimate factor selected from the group consisting of vehicle manufacturer, vehicle model, vehicle year, insurance company, repair time, actual repair time, labor cost, parts cost, materials cost, total repair cost, repair facility overhead and repair level.

19. The system of claim 13, wherein the software includes an algorithm for sorting the data according to a geographic area of the repair facility.

20. The system of claim 13, wherein the means for collecting quality and estimate data comprises another computer.

21. The system of claim 13, wherein the computer having the database further includes the means for collecting the quality and estimate data.

22. The system of claim 21, wherein the computer is maintained on a global communications network.

23. The system of claim 12, wherein said report having industry indicators comprising repair shop problem, vehicle repair cost, vehicle reparability and/or vehicle insurance cost balance.

* * * * *